(12) United States Patent
Kim et al.

(10) Patent No.: US 8,711,850 B2
(45) Date of Patent: Apr. 29, 2014

(54) FORMAT FOR PROVIDING TRAFFIC INFORMATION AND A METHOD AND APPARATUS FOR USING THE FORMAT

(75) Inventors: Young In Kim, Seoul (KR); Mun Ho Jung, Gyeonggi-do (KR); Moon Jeung Joe, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 800 days.

(21) Appl. No.: 11/424,111

(22) Filed: Jun. 14, 2006

(65) Prior Publication Data

US 2007/0019562 A1    Jan. 25, 2007

Related U.S. Application Data

(60) Provisional application No. 60/697,386, filed on Jul. 8, 2005, provisional application No. 60/698,481, filed on Jul. 13, 2005, provisional application No. 60/759,963, filed on Jan. 19, 2006.

(30) Foreign Application Priority Data

Sep. 16, 2005 (KR) .................. 10-2005-0086887
Oct. 17, 2005 (KR) .................. 10-2005-0097452

(51) Int. Cl.
*G06F 19/00* (2011.01)
*G08G 1/01* (2006.01)

(52) U.S. Cl.
CPC .................................. *G08G 1/0104* (2013.01)
USPC ........... 370/389; 370/232; 370/237; 370/252; 370/356; 370/392; 701/117; 701/468

(58) Field of Classification Search
USPC ............... 701/200–213; 340/988–995.15
See application file for complete search history.

(56) References Cited

U.S. PATENT DOCUMENTS 4,907,159 A    3/1990   Mauge 5,649,297 A    7/1997   Park
(Continued)

FOREIGN PATENT DOCUMENTS

DE    197 33 179    5/1998
DE    100 60 599    6/2002
(Continued)

OTHER PUBLICATIONS

Tristan Ferne BBC, TPEG C++ Library Documentation (v2.0), Mar. 20, 2002.*

(Continued)

*Primary Examiner* — Faruk Hamza
*Assistant Examiner* — Aixa A Guadalupe-Cruz
(74) *Attorney, Agent, or Firm* — Fish & Richardson P.C.

(57) ABSTRACT

A method for identifying traffic information includes receiving traffic data including a first identifier, an amount of time currently taken to traverse a particular link, and information corresponding to a location associated with the particular link. The first identifier enables a determination of a type of the information that is included within the received traffic data. The method also includes determining a type of information included within the received traffic data based on the first identifier and determining current travel time information based on the information included in the received traffic data only if the first identifier enables a determination that the received traffic data includes an amount of time. The method further includes determining location information based on the information that is included in the received traffic data corresponding to the location associated with the particular link and identifying traffic information based on the determined current travel time information and the determined location information.

7 Claims, 8 Drawing Sheets

(56) References Cited

U.S. PATENT DOCUMENTS

| | | |
|---|---|---|
| 5,662,109 A | 9/1997 | Hutson |
| 5,933,100 A | 8/1999 | Golding |
| 6,067,499 A | 5/2000 | Yagyu et al. |
| 6,067,502 A | 5/2000 | Hayashida et al. |
| 6,075,467 A | 6/2000 | Ninagawa |
| 6,085,137 A | 7/2000 | Aruga et al. |
| 6,101,443 A | 8/2000 | Kato et al. |
| 6,115,667 A | 9/2000 | Nakamura |
| 6,125,323 A | 9/2000 | Nimura et al. |
| 6,128,571 A | 10/2000 | Ito et al. |
| 6,232,917 B1 | 5/2001 | Baumer |
| 6,236,933 B1* | 5/2001 | Lang ............................ 701/117 |
| 6,324,466 B1 | 11/2001 | Vieweg |
| 6,401,027 B1 | 6/2002 | Xu |
| 6,434,477 B1 | 8/2002 | Goss |
| 6,438,490 B2 | 8/2002 | Ohta |
| 6,438,561 B1* | 8/2002 | Israni et al. ................. 707/104.1 |
| 6,453,230 B1 | 9/2002 | Geurts |
| 6,477,459 B1 | 11/2002 | Wunderlich |
| 6,594,576 B2 | 7/2003 | Fan |
| 6,597,982 B1 | 7/2003 | Schmidt |
| 6,610,321 B2 | 8/2003 | Huang et al. |
| 6,611,749 B1 | 8/2003 | Berwanger |
| 6,615,133 B2 | 9/2003 | Boies et al. |
| 6,618,667 B1 | 9/2003 | Berwanger |
| 6,633,808 B1 | 10/2003 | Schulz et al. |
| 6,687,611 B1 | 2/2004 | Hessing et al. |
| 6,741,932 B1 | 5/2004 | Groth |
| 6,810,321 B1 | 10/2004 | Cook |
| 6,873,904 B2 | 3/2005 | Yamamoto et al. |
| 6,904,362 B2 | 6/2005 | Nakashima et al. |
| 6,924,751 B2 | 8/2005 | Hempel et al. |
| 6,970,132 B2 | 11/2005 | Spilker, Jr. |
| 6,990,407 B1 | 1/2006 | Mbekeani et al. |
| 6,995,769 B2 | 2/2006 | Ordentlich et al. |
| 6,996,089 B1 | 2/2006 | Ruf |
| 7,013,983 B2 | 3/2006 | Matsumoto et al. |
| 7,047,247 B1 | 5/2006 | Petzold et al. |
| 7,106,219 B2 | 9/2006 | Pearce |
| 7,139,467 B2 | 11/2006 | Seo et al. |
| 7,139,659 B2 | 11/2006 | Mbekeani et al. |
| 7,188,025 B2 | 3/2007 | Hudson |
| 7,251,558 B1 | 7/2007 | McGrath |
| 7,269,503 B2 | 9/2007 | McGrath |
| 7,319,931 B2 | 1/2008 | Uyeki et al. |
| 7,355,528 B2* | 4/2008 | Yamane et al. .......... 340/995.13 |
| 7,373,247 B2* | 5/2008 | Park ............................ 701/208 |
| 7,375,649 B2 | 5/2008 | Gueziec |
| 7,403,852 B2 | 7/2008 | Mikuriya et al. |
| 7,609,176 B2 | 10/2009 | Yamane et al. |
| 7,650,227 B2 | 1/2010 | Kirk et al. |
| 7,657,372 B2 | 2/2010 | Adachi et al. |
| 7,668,209 B2 | 2/2010 | Kim et al. |
| 7,701,850 B2 | 4/2010 | Kim et al. |
| 7,729,335 B2 | 6/2010 | Lee et al. |
| 7,739,037 B2 | 6/2010 | Sumizawa et al. |
| 7,825,825 B2 | 11/2010 | Park |
| 7,877,203 B2 | 1/2011 | Mikuriya et al. |
| 7,907,590 B2 | 3/2011 | Lee et al. |
| 7,940,741 B2 | 5/2011 | Lee et al. |
| 7,940,742 B2 | 5/2011 | Lee et al. |
| 2001/0001848 A1 | 5/2001 | Oshizawa et al. |
| 2001/0028314 A1 | 10/2001 | Hessing et al. |
| 2003/0036824 A1 | 2/2003 | Kuroda et al. |
| 2003/0083813 A1 | 5/2003 | Park |
| 2003/0102986 A1 | 6/2003 | Hempel et al. |
| 2003/0179110 A1 | 9/2003 | Kato |
| 2004/0148092 A1 | 7/2004 | Kim et al. |
| 2004/0198339 A1 | 10/2004 | Martin |
| 2004/0246888 A1 | 12/2004 | Peron |
| 2004/0249560 A1* | 12/2004 | Kim et al. .................... 701/117 |
| 2005/0027437 A1 | 2/2005 | Takenaga et al. |
| 2005/0038596 A1 | 2/2005 | Yang et al. |
| 2005/0081240 A1 | 4/2005 | Kim |
| 2005/0107944 A1 | 5/2005 | Hovestadt et al. |
| 2005/0141428 A1 | 6/2005 | Ishikawa |
| 2005/0143906 A1 | 6/2005 | Ishikawa et al. |
| 2005/0198133 A1 | 9/2005 | Karaki |
| 2005/0206534 A1 | 9/2005 | Yamane |
| 2005/0209772 A1 | 9/2005 | Yoshikawa |
| 2005/0231393 A1 | 10/2005 | Berger |
| 2006/0064233 A1 | 3/2006 | Adachi et al. |
| 2006/0139234 A1 | 6/2006 | Tanaka |
| 2006/0143009 A1 | 6/2006 | Jost et al. |
| 2006/0173841 A1 | 8/2006 | Bill |
| 2006/0178105 A1 | 8/2006 | Kim |
| 2006/0178807 A1 | 8/2006 | Kato et al. |
| 2006/0262662 A1 | 11/2006 | Jung et al. |
| 2006/0265118 A1 | 11/2006 | Lee et al. |
| 2006/0268721 A1* | 11/2006 | Lee et al. ........................ 370/237 |
| 2006/0268736 A1 | 11/2006 | Lee et al. |
| 2006/0268737 A1 | 11/2006 | Lee et al. |
| 2006/0271273 A1 | 11/2006 | Lee et al. |
| 2006/0281444 A1* | 12/2006 | Jung et al. .................. 455/414.4 |
| 2007/0005795 A1 | 1/2007 | Gonzalez |
| 2007/0019562 A1 | 1/2007 | Kim et al. |
| 2007/0122116 A1 | 5/2007 | Seo et al. |
| 2007/0167172 A1 | 7/2007 | Kim et al. |
| 2008/0249700 A1 | 10/2008 | Kim et al. |
| 2009/0125219 A1 | 5/2009 | Lee et al. |

FOREIGN PATENT DOCUMENTS

| | | |
|---|---|---|
| DE | 101 01 349 | 8/2002 |
| EP | 0 725 500 | 8/1996 |
| EP | 1 006 684 | 6/2000 |
| EP | 1 030 475 | 8/2000 |
| EP | 1 041 755 | 10/2000 |
| EP | 1 079 353 | 2/2001 |
| EP | 1150265 A3 | 7/2002 |
| EP | 1 376 512 | 1/2004 |
| EP | 1 445 750 | 8/2004 |
| EP | 1 460 599 | 9/2004 |
| EP | 1587045 A1 | 10/2005 |
| EP | 1 049 277 B1 | 2/2007 |
| GB | 2 342 260 | 4/2000 |
| JP | 09-062884 | 3/1997 |
| JP | 11-160081 | 6/1999 |
| JP | 2001-082967 | 3/2001 |
| JP | 2001-227963 A | 8/2001 |
| JP | 2001-272246 | 10/2001 |
| JP | 2004-164373 | 6/2004 |
| JP | 2004-186741 | 7/2004 |
| JP | 2004-295736 | 10/2004 |
| JP | 2004-355662 | 12/2004 |
| JP | 2005-056061 | 3/2005 |
| KR | 1998-026123 A | 7/1998 |
| KR | 10-1999-0025959 | 4/1999 |
| KR | 10-2001-0016252 | 3/2001 |
| KR | 10-2002-0017535 | 3/2002 |
| KR | 2003-009244 A | 1/2003 |
| KR | 10-2003-0034915 | 5/2003 |
| KR | 10-2003-0037455 | 5/2003 |
| KR | 10-2004-0033141 | 4/2004 |
| KR | 10-2004-0084374 | 10/2004 |
| KR | 10-2004-0084508 | 10/2004 |
| KR | 2004-102056 A | 12/2004 |
| KR | 10-2005-0037776 | 4/2005 |
| KR | 10-2005-0062320 | 6/2005 |
| KR | 2005-094879 A | 9/2005 |
| KR | 10-2006-0002468 | 1/2006 |
| KR | 10-0565089 | 3/2006 |
| KR | 10-2006-0063563 | 6/2006 |
| KR | 10-2006-0063629 | 6/2006 |
| KR | 10-2006-0076574 | 7/2006 |
| KR | 10-20060129769 A | 12/2006 |
| WO | WO 98/24079 | 6/1998 |
| WO | WO 98/26395 | 6/1998 |
| WO | WO 98/26396 | 6/1998 |
| WO | WO 98/41959 | 9/1998 |
| WO | WO 00/30058 | 5/2000 |
| WO | WO 00/36771 | 6/2000 |
| WO | WO 00/39774 | 7/2000 |
| WO | WO 01/06478 | 1/2001 |

(56) References Cited

FOREIGN PATENT DOCUMENTS

| WO | WO 01/18767 | 3/2001 |
|---|---|---|
| WO | WO 01/18768 | 3/2001 |
| WO | WO 01/31497 | 5/2001 |
| WO | WO 02/01532 | 1/2002 |
| WO | WO 02/13161 | 2/2002 |
| WO | WO 02/082402 | 10/2002 |
| WO | WO2004036545 A1 | 4/2004 |
| WO | WO 2004/066239 A1 | 8/2004 |
| WO | WO 2005/020576 | 3/2005 |

OTHER PUBLICATIONS

Bev Marks, TPEG-standardized at last, Oct. 2005.*
ISO/TS techincal specification, TTI via TPEG-XML part 1, Apr. 2006.*
TPEG C++ Library Documentation, Mar. 20, 2002.*
International Search Report dated Sep. 6, 2006 for Application No. PCT/KR2006/001834, 1 page.
International Search Report dated Oct. 19, 2006 for Application No. PCT/KR2006/001835, 2 pages.
International Search Report dated Aug. 28, 2006 for Application No. PCT/KR2006/001859, 1 page.
International Search Report dated Sep. 27, 2006 for Application No. PCT/KR2006/001837, 2 pages.
International Search Report dated Aug. 28, 2006 for Application No. PCT/KR2006/001860, 1 page.
European Search Report dated Aug. 11, 2008 for Application No. 06747441.1, 8 pages.
European Search Report dated Sep. 25, 2008 for Application No. 06747435.3, 8 pages.
European Search Report dated Jun. 30, 2008 for Application No. 06747440.3, 10 pages.
European Search Report dated Oct. 15, 2008 for Application No. 06747434.6, 8 pages.
European Search Report dated Aug. 14, 2008 and Jul. 28, 2008 for Application No. 06747433.8, 11 pages.
Office Action dated Jan. 2, 2009 for U.S. Appl. No. 11/419,095. 32 pages.
Korean Office Action dated Nov. 15, 2006 for Application No. KR 10-2005-0086890, 3 pages.
European Search Report dated Sep. 30, 2008 for Application No. 06747474.2, 8 pages.
International Search Report dated Oct. 19, 2006 for Application No. PCT/KR2006/002068, 1 page.
European Search Report dated Jul. 30, 2008 for Application No. 06747437.9, 9 pages.
International Search Report dated Aug. 28, 2006 for Application No. PCT/KR2006/001836, 1 page.
International Search Report dated Sep. 6, 2006 for Application No. PCT/KR2006/001843, 9 pages.
International Search Report dated Apr. 25, 2007 for Application No. PCT/KR2007/000324, 7 pages.
International Search Report dated May 8, 2007 for Application No. PCT/KR2007/000318, 7 pages.
Office Action dated Feb. 24, 2009 for U.S. Appl. No. 11/419,127, 37 pages.
Office Action dated Apr. 3, 2009 for U.S. Appl. No. 11/419,164, 44 pages.
Office Action issued in U.S. Appl. No. 11/419,127 mailed Feb. 24, 2009.
Office Action issued in U.S. Appl. No. 11/419,164 mailed Apr. 3, 2009.
U.S. Office Action dated Jul. 22, 2009 for U.S. Appl. No. 11/419,127, 18 pages.
U.S. Office Action dated Jul. 31, 2009 for U.S. Appl. No. 11/419,095; 30 pages.
European Search Report dated Nov. 17, 2008 for Application No. 06747441.1, 7 pages.
European Search Report dated Sep. 4, 2009 for Application No. 09165793.2-2215, 9 pages.
Office Action issued in U.S. Appl. No. 11/419,164 dated Oct. 1, 2009, 30 pages.
Office Action issued in U.S. Appl. No. 11/419,178 dated Sep. 3, 2009, 10 pages.
European Search Report dated Oct. 23, 2009 for Application No. 09170601.0-2215.
European Search Report dated Oct. 26, 2009 for Application No. 0970878.4.0-2215.
Notice of Allowance issued in U.S. Appl. No. 11/419,095 dated Dec. 3, 2009.
Office Action issued in U.S. Appl. No. 11/419,127 dated Dec. 14, 2009.
European Search Report dated Nov. 4, 2009 issued in European Application No. 09171279.4-2215, 7 pages.
"TPEG TEC Application Specification," Working Document, Development Project, Mobile.Info, Mar. 9, 2006, 30 pages.
European Office Action and Search Report issued in Application No. 09159699.9-2215 dated Jun. 26, 2009.
European Search Report dated Jun. 20, 2008 for Application No. 06747461.9, 8 pages.
International Search Report dated Sep. 6, 2006 for Application No. PCT/KR2006/2002012, 2 pages.
Office Action issued in U.S. Appl. No. 11/419/187 dated Feb. 19, 2010, 30 pages.
Office Action issued in U.S. Appl. No. 11/419,164 dated Mar. 11, 2010, 32 pages.
U.S. Office Action dated Jun. 7, 2010 for U.S. Appl. No. 11/419,127, 24 pages.
U.S. Office Action dated Jul. 1, 2010 for U.S. Appl. No. 11/914,682, 11 pages.
U.S. Notice of Allowance dated Jul. 21, 2010 for U.S. Appl. No. 11/419,164, 15 pages.
U.S. Notice of Allowance dated Aug. 9, 2010 for U.S. Appl. No. 11/419,095, 17 pages.
U.S. Final Office Action dated Aug. 13, 2010 for U.S. Appl. No. 11/419,187, 16 pages.
U.S. Notice of Allowance and Fee(s) Due for U.S. Appl. No. 11/419,127 dated Dec. 13, 2010, 17 pages.
U.S. Non-Final Office Action dated Feb. 3, 2011 for Application No. 11/419,178, 12 pp.
U.S. Notice of Allowance for U.S. Appl. No. 11/419,127 dated Aug. 23, 2010 (17 pages).
U.S. Notice of Allowance for U.S. Appl. No. 11/419,164 dated Sep. 8, 2010 (11 pages).
U.S. Office Action for U.S. Appl. No. 11/419,187 dated Aug. 13, 2010 (16 pages).
US Notice of Allowance dated Apr. 8, 2011 for U.S. Appl. No. 11/624,424, 9 pages.
Korean Notice of Allowance dated Mar. 7, 2013 for Application No. 10-2006-0055870, with English Translation, 3 pages.
US Notice of Allowance dated Aug. 1, 2011 for U.S. Appl. No. 11/419,178, 11 pages.
Korean Notice of Allowance dated Jan. 27, 2012 for Application No. 10-2005-0097452, with English Translation, 3 pages.

* cited by examiner

```
<status_component(00)>:=      : average speed on a link
<intunti>(id),                : identifier, id=00
<intunti>(n),                 : data length in byte (n)
<intunti>;                    : speed (m/s*0.25)
```
51

FIG. 5b

```
<status_component(00)>:=      : average speed on a link
<intunti>(id),                : identifier, id=00
<intunti>(n),                 : data length in byte (n)
<intunti>;                    : speed (km/h)
```
52

FIG. 5c

```
<status_component(00)>:=      : average speed on a link
<intunti>(id),                : identifier, id=00
<intunti>(n),                 : data length in byte (n)
<intunti>;                    : speed (0.5km/h or 1km/h)
```

| b7 | b6 | b5 | b4 | b3 | b2 | b1 | b0 |
| F | Speed_Value (7bits) |

0: time unit of 0.5km/h => Speed_Value*0.5km/h

1: time unit of 1 km/h => Speed_Value + 63.5km/h

| | |
|---|---|
| <status_component(01)>:= | : travel time for a link |
| <intunti>(id), | : identifier id=01 |
| <intunti>(n), | : data length in byte (n) |
| <intunti>; | : time | b7　b6　b5　b4　b3　b2　b1　b0

0~255 (10 seconds in unit)

FIG. 6d

| | |
|---|---|
| <status_component(01)>:= | : travel time for a link |
| <intunti>(id), | : identifier id=01 |
| <intunti>(n), | : data length in byte (n) |
| <intunti>+1; | : time |

0:min. ; 1: second

F b7　b6　b5　b4　b3　b2　b1　b0　63

0~255 (minute or second in unit)

FORMAT FOR PROVIDING TRAFFIC INFORMATION AND A METHOD AND APPARATUS FOR USING THE FORMAT

CROSS-REFERENCE TO RELATED APPLICATIONS

The present application claims priority from U.S. provisional application Nos. 60/697,386 filed Jul. 8, 2005, which is titled "Format For Carrying Speed Information Of A Link," 60/698,481 filed Jul. 13, 2005, which is titled "Format of Link Pass-Time," and 60/759,963 filed Jan. 19, 2006, which is titled "Traffic Information Providing Method," the entire contents of which are incorporated herein by reference. The present application also claims priority to Korean application Nos. 10-2005-0086887 filed Sep. 16, 2005 and 10-2005-0097452 filed Oct. 17, 2005 the entire contents of which are incorporated herein by reference.

BACKGROUND

1. Field

This disclosure relates to providing traffic information including traffic data for a link and using the same.

2. Description of the Related Art

With the advancement in digital signal processing and communication technologies, radio and TV broadcasts are being digitalized. Digital broadcasting enables provision of various information (e.g., news, stock prices, weather, traffic information, etc.) as well as audio and video content.

SUMMARY

In one general aspect, a method for identifying traffic information is provided. The method includes receiving traffic data including a first identifier, an amount of time currently taken to traverse a particular link, and information corresponding to a location associated with the particular link. The first identifier enables a determination of a type of the information that is included within the received traffic data. The method also includes determining a type of information included within the received traffic data based on the first identifier and determining current travel time information based on the information included in the received traffic data only if the first identifier enables a determination that the received traffic data includes an amount of time. The method further includes determining location information based on the information that is included in the received traffic data corresponding to the location associated with the particular link and identifying traffic information based on the determined current travel time information and the determined location information.

Implementations may include one or more additional features. For instance, determining current travel time information may include accessing received data corresponding to, among other items, results of measurements made with respect to traffic previously traversing the link, and computing an amount of travel time based on the received data. Determining current travel time information may involve accessing information provided within the received traffic data and recognizing that data as the amount of travel time.

The method may also include receiving information corresponding to a message management structure including information corresponding to a generation time of information reflected in the traffic data. The generation time included within the received message management structure may relate to a plurality of message component structures that correspond to more than one of a predicted or current traffic tendency, a predicted or current amount of traffic, a predicted or current speed, or a predicted or current time to traverse a particular link. Each message component structure may further include an identifier specific to the type of information and the first identifier may be an identifier, in a message component structure, specific to the current travel time amount for the particular link.

Also, in the method, the current travel time information and the location information may be determined in a single step. The location information may be determined before the current travel time information is determined. Receiving traffic data may include decoding the traffic data such that the received traffic data is decoded traffic data. Receiving information corresponding to a current travel time amount may include receiving a value associated with a text description of an amount of travel time, and determining, with the received value, the text description. Receiving information corresponding to a current of travel time amount may include receiving a current amount of travel time for the link including a text descriptor. The amount of time currently taken to traverse a particular link may reflect the current travel time amount.

Further, in the method, the amount of time currently taken to traverse the link may be reflected in a number of seconds. The amount of time currently taken to traverse the link may be reflected in a unit of time that is smaller than a second. The amount of time may be reflected in one or more bytes, each byte including a first portion of the byte which determines a value in terms of minutes and a second portion of the byte, consisting of five or less bits, which determines a number of tens of seconds. Receiving an amount of time may include receiving a flag value that determines whether associated data is in terms of either a first unit or a second unit. The first unit may be minutes and the second unit may be seconds. Receiving an amount of time may include receiving a flag value that determines whether associated data will include one or more additional packets of information. The flag value may indicate that the associated data will be delivered with a single additional byte.

In another general aspect, a method for identifying traffic information is provided. The method includes extracting a traffic information message including message segments and extracting a first component including status information from the extracted traffic information message. The method also includes extracting, from the first component, congestion information for a link from the status information and extracting a second component including status information from the extracted traffic information message. The method further includes extracting, from the second component, speed information for a link from the status information and extracting a third component including status information from the extracted traffic information message. Also, the method further includes extracting, from the third component, travel time information for a link from the status information and identifying, based on the extracted information, congestion information, speed information, and travel time information for the link.

In a further general aspect, an apparatus for identifying traffic information is provided. The apparatus includes an interface configured to receive traffic data including a first identifier, information corresponding to an amount of time currently taken to traverse a particular link, and information corresponding to a location associated with the particular link. The first identifier enables a determination of a type of the information that is included within the received traffic data. The apparatus includes a processor configured to determine a type of information included within the received traffic data based on the first identifier and determining current travel time information based on the information included in the received traffic data only if the first identifier enables a determination that the received traffic data includes an amount of time. The processor is also configured to determine received traffic data includes an amount of time based on the information that is included in the received traffic data corresponding to the location corresponding to the particular link and identify traffic information based on the determined current travel time information and the determined location information.

Implementations may include one or more additional features. For instance, in the apparatus, the processor may be configured to receive traffic data including information corresponding to a version number of information reflected in the traffic data. The version number may be associated with a specific syntax of the data where any one of multiple syntaxes may be used.

Also, in the apparatus, the processor may be configured to receive information corresponding to a message management structure including information corresponding to a generation time of information reflected in the traffic data. The processor may be configured to receive information corresponding to a data length of the received data.

Further, in the apparatus, the processor may be further configured to determine the amount of travel time for a particular link only if the first identifier enables a determination that the traffic data relates to a current travel time for a particular link The details of one or more implementations are set forth in the accompanying drawings and the description below. Other features will be apparent from the description and drawings, and from the claims.

BRIEF DESCRIPTION OF THE DRAWINGS

The accompanying drawings illustrate various implementations.

In the drawings.

DETAILED DESCRIPTION

One such use for digital broadcasts is to satisfy an existing demand for traffic information. Proposals that involve the use of digital broadcasts for this purpose contemplate the use of standardized formatting of traffic information to be broadcast. This approach may be used to enable the use of traffic information receiving terminals made by different manufacturers, which each could be configured to detect and interpret traffic information broadcast in the same way.

Figure 1:
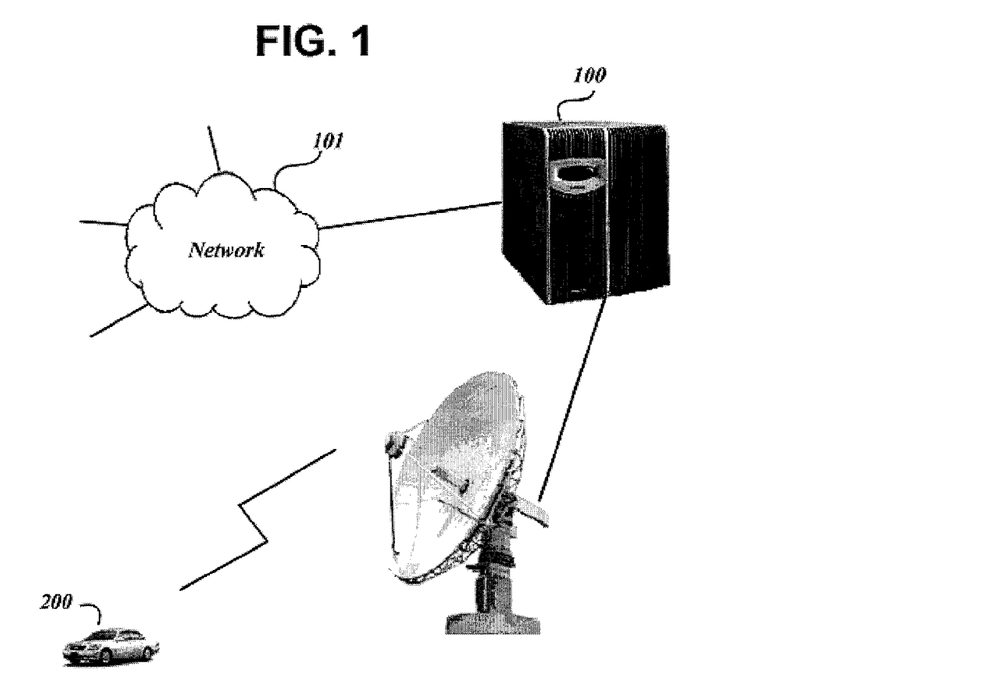
FIG. 1 illustrates a schematic diagram of a network through which traffic information is provided.

FIG. 1 is a schematic diagram of a network through which traffic information is provided. A traffic information providing server 100 in a broadcast station may transmit traffic information collected from various sources (e.g., operator input, or information received from another server or probe cars through a network 101) wirelessly so that a traffic information receiving terminal (e.g., navigation system installed in a car 200) may receive the traffic information.

Figure 2:
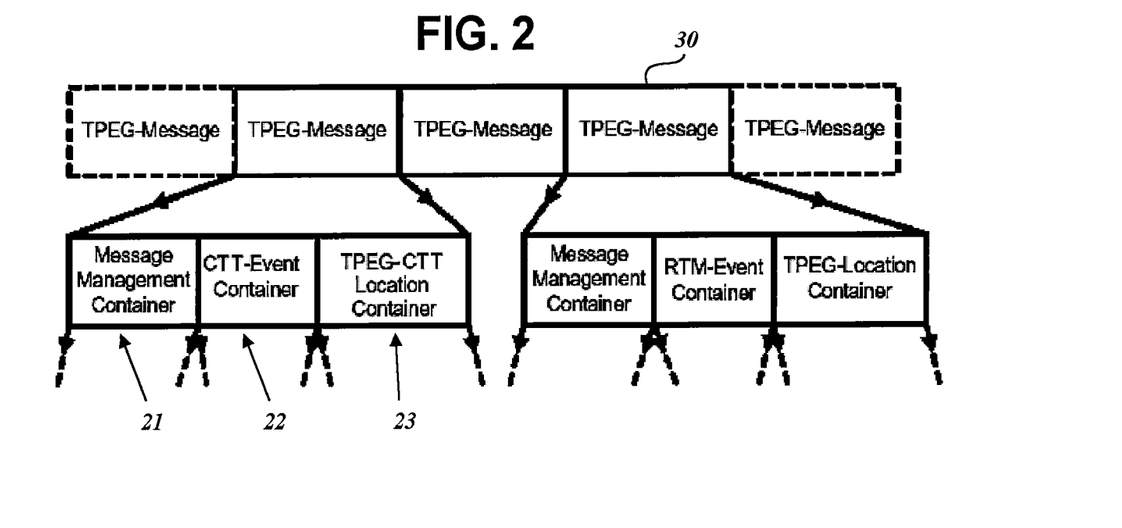
FIG. 2 illustrates a format of traffic information transmitted wirelessly.

As shown in FIG. 2, the traffic information wirelessly transmitted from the traffic information providing server 100 may be a sequence of TPEG-CTT (transport protocol expert group-congestion and travel-time Information) messages. A message segment of the sequence, i.e., a TPEG-CTT message may include a message management container 21, a CTT event container (or Application Event Container) 22, and a TPEG-CTT location container 23. The TPEG-CTT message may also include different types of containers other than, less than, or in addition to the CTT event container, as in the TPEG-CTT message 30.

The message management container 21 may be used for managing date and time information. The time information may include message generation time (e.g., a chronological time indication). The message generation time may be included in every TPEG-CTT message when the corresponding message is transmitted. The CTT event container 22 may include congestion and travel time status and predicted congestion and travel time status of links, i.e., road segments. The congestion and travel time status may include average link speed, link travel time, link delay, or congestion type, etc.

The TPEG-CTT location container 23 may employ various location reference processes. For example, a location reference process using a coordinate system or a location reference process using pre-promised links may be used. When a coordinate system is used, the coordinates (latitudes and longitudes) of the start and end positions of a link for which the TPEG-CTT message is created, may be transmitted. When a reference process using pre-promised links is used, a unique identification for a specific link on a receiving device may be transmitted. For example, a receiving device may include a locally stored network of links, where in each link may be identified by a unique identifier. A link may refer to a road segment which starts and ends at junctions and has no junction in between. The coordinate system may be the WGS 84 model. A text formatted name of the link may be transmitted.

In various implementations, a CTT event container and a TPEG-CTT location container are composed of one or more CTT components. Each of the CTT components may be constructed according to a first syntax if it carries congestion status information while it may be constructed according to a second syntax if the component carries location information.

A CTT event container 22 may be composed of one component or a plurality of CTT components. In various implementations, CTT components including an ID of 80 h (notation 'h' means hexadecimal) or 84 h includes one or more status components including basic traffic information such as the average link speed, link travel time, link delay, or congestion type. In the description, specific IDs are described as assignments to structures associated with specific information. The actual value of an assigned ID (e.g., 80 h) is exemplary, and different implementations may assign different values for specific associations or circumstances.

In various implementations, CTT components including an ID of 81 h include one or more status components including predicted CTT status. The predicted CTT status may include predicted average link speed, predicted link travel time, or congestion acceleration tendency. The congestion acceleration tendency may include information indicative of the tendency of congestion status. The congestion acceleration tendency will be described as a type of prediction information as the congestion status in the near future may be predicted from it.

In various implementations, the TPEG-CTT message may comprise CTT components structured to deliver additional information of traffic information. An identifier 8Ah may be assigned to the CTT component carrying additional information, and a language code that is indicative of language used for the additional information may also be included in the CTT component.

Figure 3:
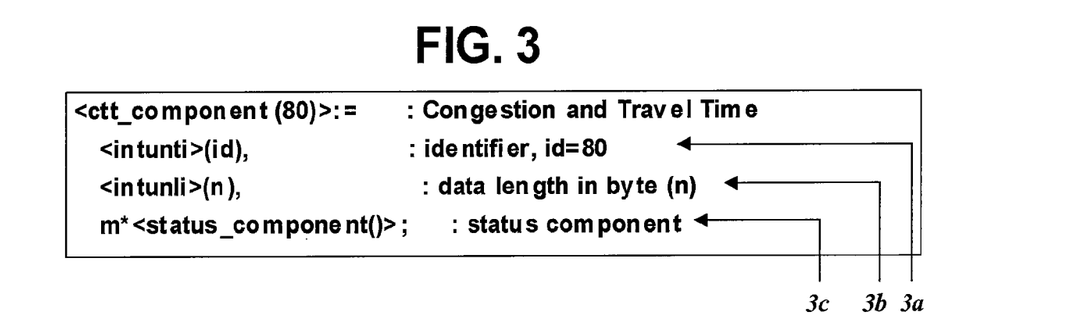
FIG. 3 illustrates a structure of congestion and travel time information included in a CTT event container.

FIG. 3 illustrates a syntax, according to various implementations, of a structure of a congestion and travel time information component (hereinafter, referred to as CTT component) belonging to a CTT event container (e.g., at reference numeral 22 for FIG. 2). The FIG. 3 CTT component has an ID of '0x80' 3a, includes m status components 3c, and has a field expressed in byte 3b indicating the length of the whole data of the status components included therein.

Figure 4A:
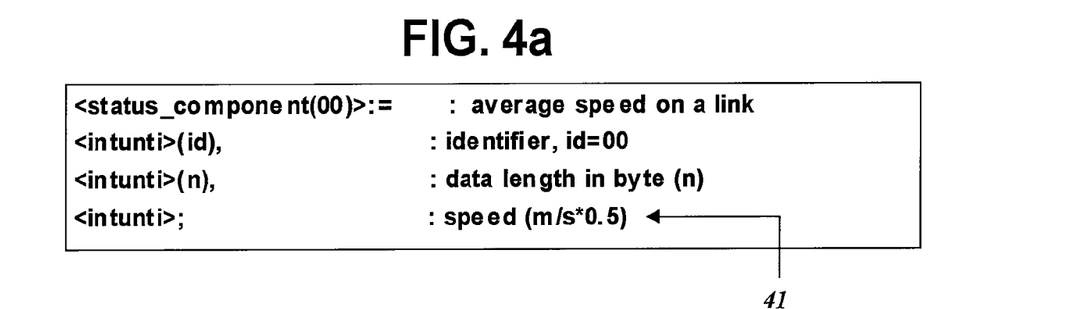
FIGS. 4a through 4c illustrate average speed on a link, travel time for the link, and syntax for degree of congestion included in the status component of the CTT event container of FIG. 3.
Figure 4B:
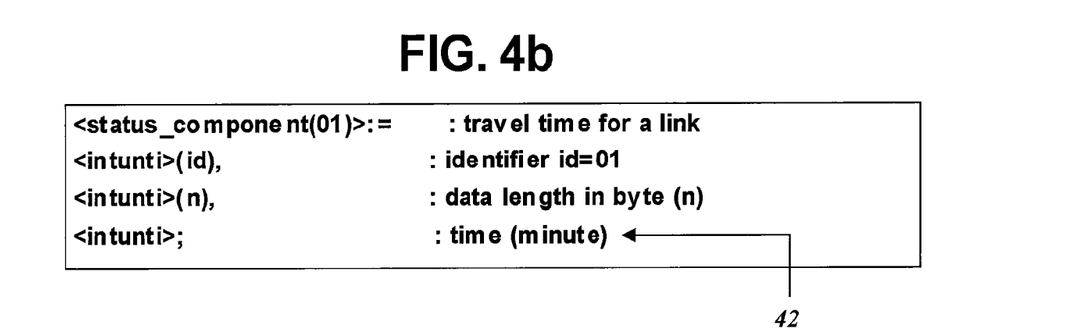
Figure 4C:
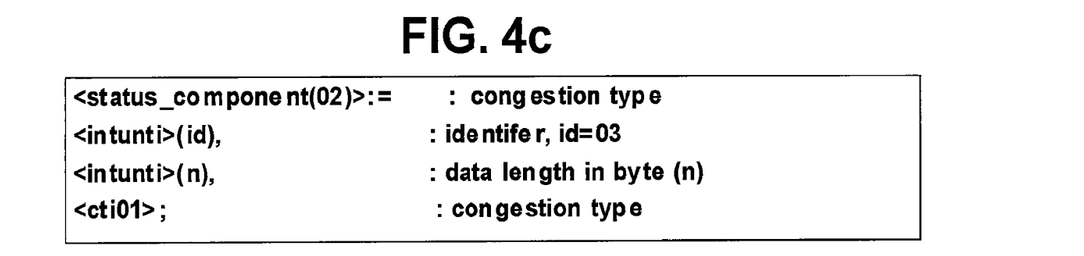

Status components may, for example, use 8 bits to transfer average speed on a link, travel time for a link, and/or information about degree of congestion in a format illustrated in FIGS. 4a through 4c. In one implementation, an ID of '00' is assigned to average speed on a link; an ID of '01' is assigned to travel time for a link; and an ID of '03' is assigned to degree of congestion.

A numeric value expressed in units such as, for example, of 0.5 m/s (namely, 1.8 km/h) may be carried in the field 41 for average speed on a link ('intunti' denotes size of byte) and a numeric value expressed in units such as, for example, minutes is carried in the field for travel time for a link 42. Information about travel time for a link may be obtained by retrieving the link length from a link information (e.g., link length, linkwidth, etc.) database constructed in the server 100 and dividing the link length by average speed on the corresponding link obtained from traffic information collected from various sources, being provided after further rounding off to the units of minute (e.g., a travel time exceeding 30 seconds is rounded off to one minute).

In one implementation, if average speed on a link is transmitted in the units of 0.5 m/s (1.8 km/h), the allowable range of the speed in 8-bit expression may amount to 0~459 km/h. Since it may be unnecessary to express the average speed up to a very high value (e.g., beyond 200 km/h), it may be better to consider a very high speed (e.g., average speed higher than 200 km/h) to be resulting from drivers speeding in the corresponding link rather than current traffic condition. Accordingly, from a viewpoint of providing traffic congestion information, it may be useless to provide information indicating up to a very high speed.

On the other hand, in the case of traffic congestion, even 1 km/h difference in the average speed may be an important factor for a driver to choose a particular route. In this respect, a resolution of 1.8 km/h cannot discriminate 1 km/h difference in the average speed. Therefore, when average speed on a link becomes low, the average speed information expressed in units of 0.5 m/s (=1.8 km/h) may not satisfy drivers requirement on the degree of resolution.

Similarly, if travel time for a link is provided in units of minute, round-off error may become large when the length of the link is short. For example, if the link length is 500 meters and average speed on the link is 20 m/s (=72 km/h), travel time for the link will become 25 seconds; if the link length is 1000 meters and average speed on the link is 20 m/s, travel time for the link will become 50 seconds; for another example, if the link length is 2900 meters and average speed on the link is 20 m/s, travel time for the link will be 145 seconds. In these cases, the travel time for the link delivered to the status component corresponds to 0, 1, and 2 minutes, respectively; therefore, the difference between actual travel time and the travel time provided by traffic information amounts to 25, 10, and 25 seconds. These errors may become more prominent in links of short lengths.

Therefore, in various implementations, as to the delivery of information about average speed on a link, the maximum speed is lower than may be introduced to improve resolution in low speed links. Likewise, as to the delivery of information about travel time for a link, information expressed in units of seconds may be permitted an 8 bit representation may be employed for delivering information about travel time for a link expressed in units of seconds; however, additional bits may also be assigned to deliver the information expressed in units second.

Figure 5A:
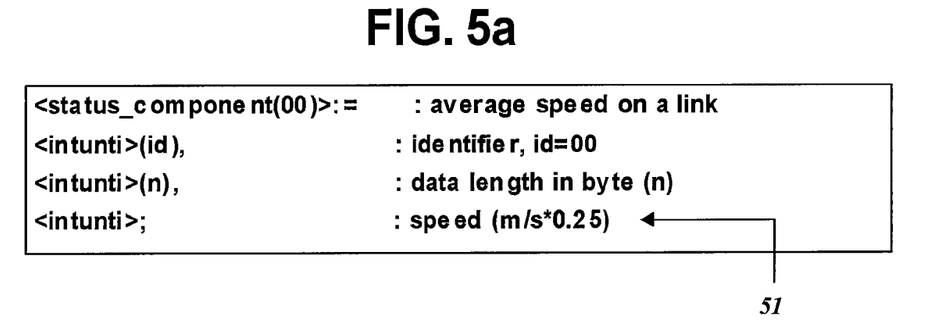
FIGS. 5a through 5c illustrate structures of a status component delivering average speed on a link.

As shown in FIG. 5a, in one implementation, the following format for delivering information about average speed on a link may be employed: 0.25 m/s (=0.9 km/h). By using the speed unit, the maximum speed that an 8-bit field indicative of average speed 51 may represent becomes 229.5 km/h.

The unit of 0.25 m/s is, only an arbitrary example; therefore, in order to increase the speed resolution in a link of slow speed, a much lower unit, for example, 0.2 m/s (the maximum allowable speed for representation is 183.6 km/h) or 0.15 m/s (the maximum allowable speed for representation is 137.7 km/h) may be employed. Increasing speed resolution by lowering the speed unit is advantageous for the cases where traffic regulations restrict the maximum speed (e.g., to 110 km/h).

Figure 5B:
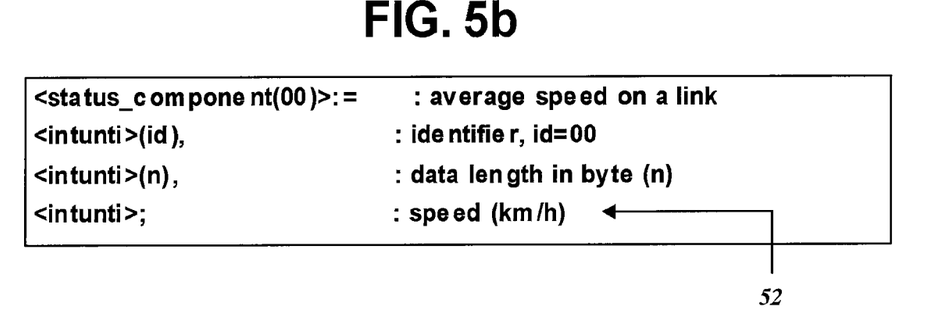

As shown in FIG. 5b, average speed on a link may also be provided in units of 1 km/h. According to this implementation, the allowable range that the field indicative of average speed 52 may represent becomes 0~255 km/h and figures below a decimal point do not occur. Although the maximum speed allowable for representation is decreased in the implementation of FIG. 5b compared with the example of FIG. 4a (459 km/h→255 km/h), the speed resolution is improved by 0.8 km/h (1.8 km/h→1 km/h).

Figure 5C:
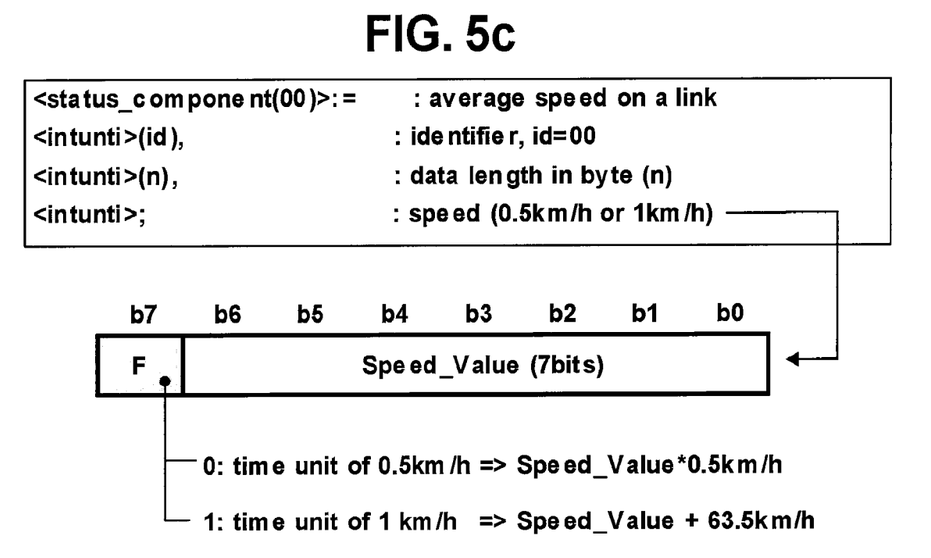

The speed resolution may play an important role depending on the magnitude of the average speed on the current link. As described earlier, when the average speed on a link is low, a driver may respond sensitively to a slight change of the average speed, whereas the driver may show lower sensitivity against a slight change of the average speed if the average speed on the link is high. Therefore, in various implementations, a variable speed unit may be employed in accordance with the magnitude of the average speed. FIG. 5c illustrates an example of a structure of the average speed field of a status component according to one implementation. The most significant bit (F) designates a speed unit on which the average speed represented by the remaining 7 bits (Speed_Value) is based. For example, if the most significant bit (F) is 0, it implies that the value carried by the remaining 7 bits (Speed_Value) corresponds to the average speed expressed in units of 0.5 km/h; when the most significant bit (F) is 1, the value carried by the remaining 7 bits (Speed_Value) corresponds to the average speed expressed in units of 1 km/h.

In the implementation of FIG. 5c, since the maximum speed that may be expressed in 0.5 km/h unit is 63.5 km/h (=127*0.5 km/h), when the most significant bit (F) is 1, the average speed amounts to the sum of what the remaining 7 bits represent and 63.5 km/h. As to a high speed value, an integer value of 63 km/h may be added instead of 63.5 km/h. For example, if the average speed field is 1:0001100, the average speed to be delivered will be 759.5 km/h (=12 km/h+ 63.5 km/h) or 759 km/h (=12 km/h+63 km/h).

Specifying the speed resolution with the two different units of 0.5 km/h and 1 km/h in the implementation of FIG. 5c is only an example; a different resolution from the specified unit may be employed. Therefore, a variable resolution depending on the magnitude of the average speed on a link should be considered to fall within the scope, even though an employed speed resolution may be different from what is described in the this disclosure.

An implementation of a format delivering information about travel time for a link is illustrated in FIGS. 6a through 6d.

Figure 6A:
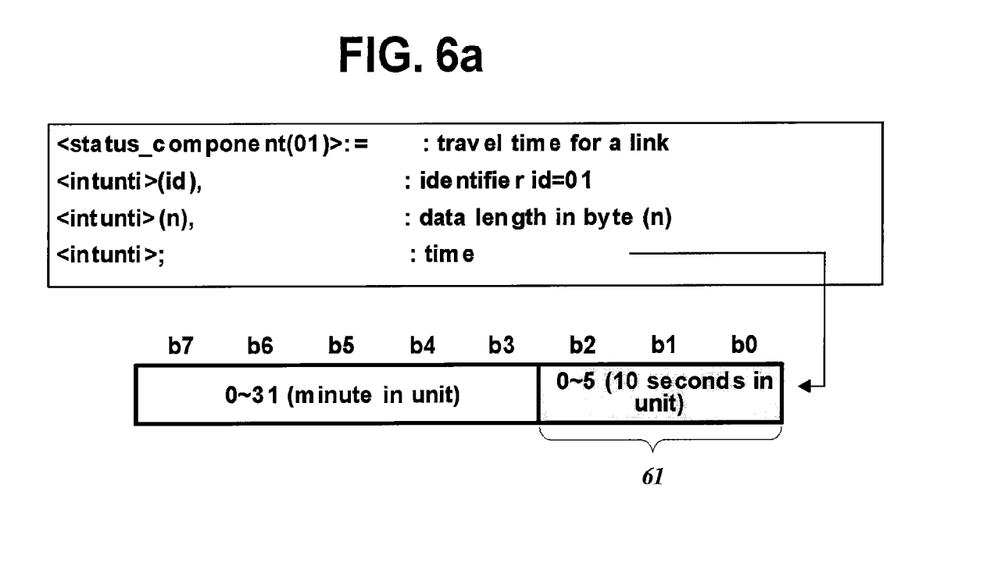
FIGS. 6a through 6e illustrate information structures for travel time for a link.

In the implementation of FIG. 6a, the higher 5 bits of 8 bits are reserved for minutes and lower 3 bits 61 are reserved for seconds. Since the allowable range that the lower 3 bits can express is from 0 to 7, the lower 3 bits 61 records the value of tens of the element expressed in second from the travel time for a link. That is to say, from the three examples described earlier, since the travel time for the link is 25, 50, and 145 seconds (2 minutes and 25 seconds), the lower 3 bits 61 records 3 (which corresponds to 30 - - - 5 seconds are rounded off), 5 (which corresponds to 50), and 3 (which corresponds to 30); the higher 5 bits records 0, 0, and 2, respectively. In the present implementation, respective errors become 5, 0, and 5 seconds and relative error magnitudes are reduced to 20% (=5/25), 0% (=0/10), and 20% (=5/25), being reduced to 13.3% on the average compared with the case expressed in minute.

Figure 6B:
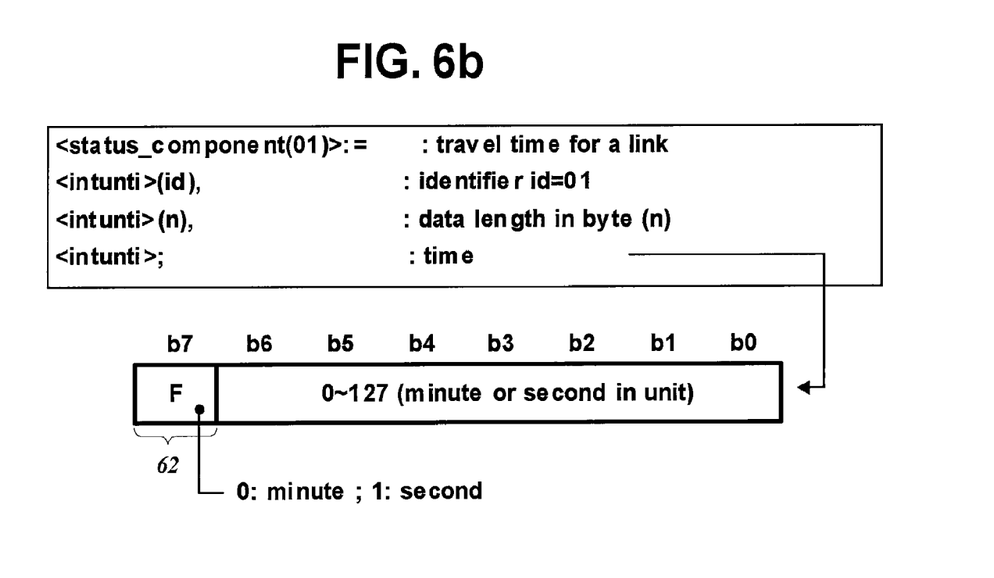

In the implementation of FIG. 6b, the time unit for the 8 bit expression is varied as needed. More specifically, lower 7 bits are reserved to represent travel time for a link in units of minute or second; the most significant bit 62 is used as a flag to designate whether the content recorded in the 7 bits is measured in units of minute or second. When the content is expressed in minute, 0 is assigned, whereas 1 is assigned when the content is expressed in second. Since the travel time for the link is 25, 50, and 145 seconds from the previous three examples, 10011001 (flag=1), 10110010 (flag=1), and 00000010 (flag=0) (=2 minutes) or 11111111 (flag=1) (=127 seconds) are recorded in the 8 bits, respectively. In the present implementation, respective errors become 0, 0, and 25 seconds (or 18 seconds) and relative error magnitudes are 0%, 0%, and 100% (or 72%), being reduced to 33.3% (or 24%) on the average compared with the case expressed in minute.

Figure 6C:
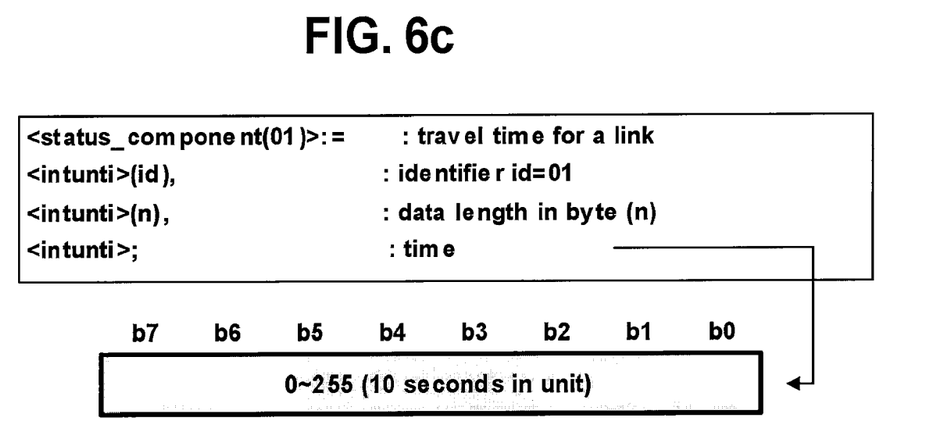

In the implementation of FIG. 6c, the entire 8 bits are used to record travel time for a link, the recording unit being less than 60 seconds and larger than 1 second (e.g., 10 seconds). Since the travel time for the link is 25, 50, and 145 seconds from the previous three examples, 3 (5 seconds are rounded off), 5, and 15 are each recorded in the 8 bits according to the implementation of FIG. 6c. In the present implementation, respective errors become 5, 0, and 5 seconds and relative error magnitudes are 20%, 0%, and 20%, being reduced to 13.3% on the average compared with the case expressed in minute. Although the present implementation shows identical results to those from the implementation of FIG. 6a, the maximum time allowable for expressing travel time for a link is 2550 seconds (4 minutes and 30 seconds), there by being larger than 3 minutes and 50 seconds of the implementation of FIG. 6a.

Figure 6D:
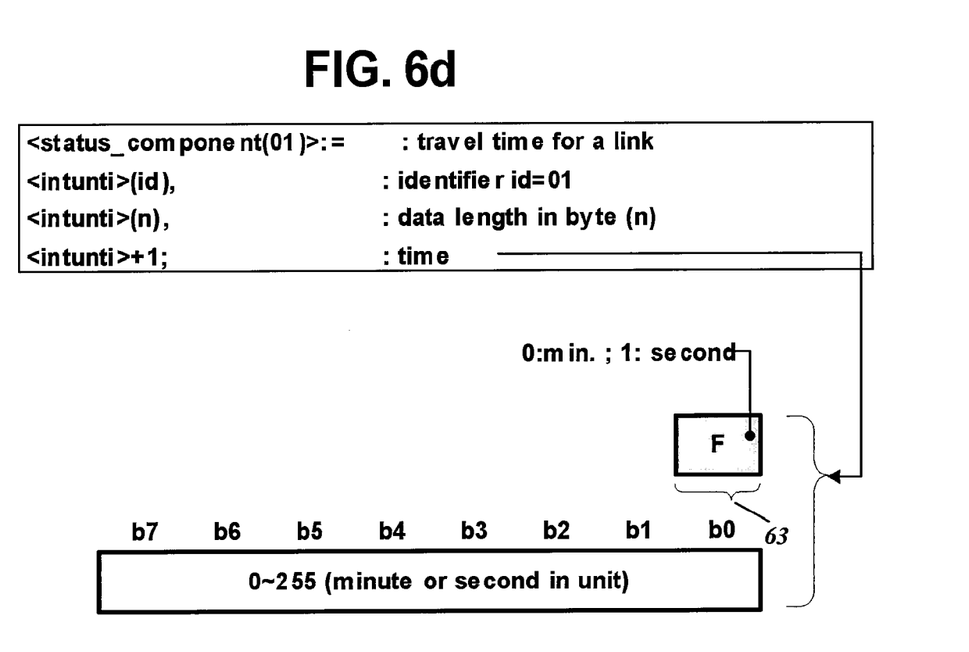

Additional bits may be assigned through a mechanism such as that shown by FIG. 6d. FIG. 6d is an implementation where a flag of one bit denoting time unit is appended.

In the implementation of FIG. 6d, the entire 8 bits are reserved for travel time for a link and an additional one bit flag 63 (e.g., this flag is set to 0 when the time unit corresponds to minute, whereas it is 1 when the time unit is second) is so assigned as to specify whether the time recorded in the 8 bits is expressed in minute or second. Since the travel time for the link is 25, 50, and 145 seconds from the previous three examples, 1:8 bits (flag:data) according to the implementation of FIG. 6d holds 1:00011001, 1:00110010, and 1:10010001, respectively. The error from each case becomes 0 in the present implementation, the error rate being reduced by 100% compared with the case expressed in minute.

Figure 6E:
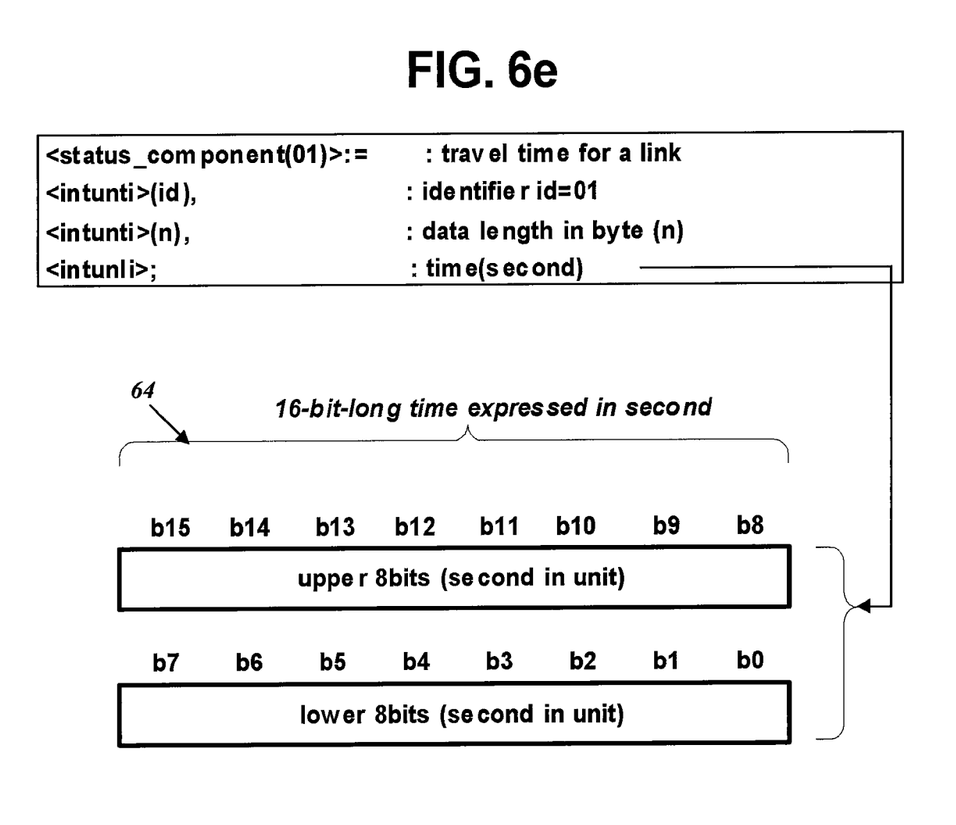

When the additional one bit does not make up 8 bits in such a way that effective information is carried in the other constituting 7 bits, the 7 bits may be wasted for the sake of simplicity for information processing. Therefore, when effective information is not included in the constituting 7 bits and thus delivered to the status component (ID 0x01), it may be useful to deliver the travel time for a link by 16 bits rather than to additionally deliver the one bit flag only, as shown in FIG. 6e ('intunli' in FIG. 6e denotes size of 16 bits). In the implementation of FIG. 6e, the entire 16 bits represent the travel time for the link 64 expressed wholly in second. In the implementation of FIG. 6e where the entire 16 bits are used to express travel time for a link, the maximum allowable time becomes 18 hours 12 minutes and 16 seconds. This representation capacity can accommodate travel time for a link for nearly all links without error.

The implementations of FIGS. 6a through 6c, where travel time for a link is expressed with 8 bits, have improved features compared with the case where the 8 bits are used to express the travel time for the link in units of minute only. However, for the implementations of FIGS. 6a and 6c, since the maximum allowable time for each case is 31 minutes and 50 seconds; and 42 minutes and 30 seconds, respectively, if a part of the link gets congested and travel time thus becomes elongated, a case where information delivery fails may happen due to the inability to represent the travel time for the link. For the implementation of FIG. 6b, a problem exists that as for the travel time for a link exceeding 127 seconds, an error happens identically to the case where the travel time for a link is delivered in units of minute. It may be particularly advantageous to employ the FIG. 6c-6e solutions when a larger range or a more precise range is required.

Figure 7:
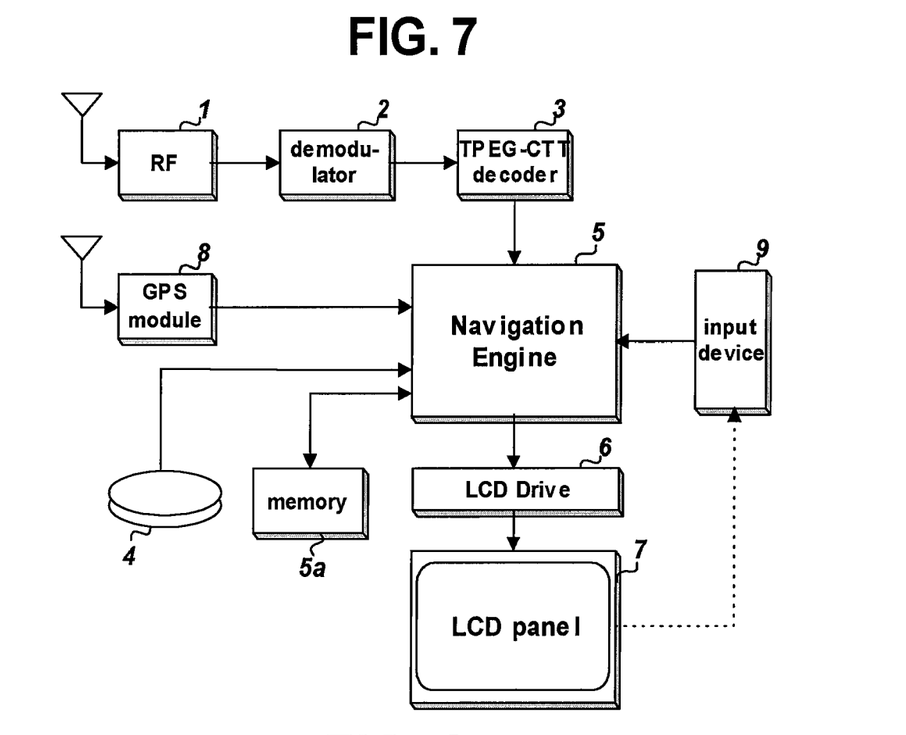
FIG. 7 illustrates a block diagram of a navigation terminal that receives traffic information transmitted from a server.

FIG. 7 is an exemplary block diagram of a navigation terminal that receives traffic information transmitted from the server 100. FIGS. 7-9b illustrate a system and graphical user interfaces appearing in exemplary implementations of systems for receiving and utilizing traffic information. Other systems may be organized differently or include different components.

The navigation terminal comprises a tuner 1 for receiving modulated traffic information signals by resonating at the required frequency band, a demodulator 2 for outputting traffic information signals by demodulating the modulated signals from the tuner 1, a TPEG-CTT decoder 3 for obtaining traffic information by decoding the demodulated traffic information signals, a GPS module 8 for calculating the current position (i.e., latitude, longitude, and altitude) by receiving signals from a plurality of satellites, storage structure 4 for storing various graphic data and an electronic map including information on links and nodes, an input unit 9 for receiving user input, a navigation engine 5 for controlling screen display based on the user input, the current position, and obtained traffic information, a memory 5a for storing data temporarily, an LCD panel 7 for displaying data, and an LCD drive 6 for driving the LCD panel 7 according to data to be presented. The input unit 9 may be a touch screen incorporated into the LCD panel 7.

The tuner 1 tunes to the frequency of the signals transmitted by the server 100 and the demodulator 2 demodulates the tuned signals in a predetermined manner. The TPEG-CTT decoder 3 decodes the input demodulated signals into a TPEG message sequence as shown in FIG. 2, interprets each TPEG message in the sequence, and then delivers necessary information and/or control signals according to the content of the message to the navigation engine 5. Though various kinds of information are provided for the navigation engine 5 by the TPEG-CTT decoder 3, for purposes of brevity, the following description focuses on the processing procedure thereof.

The TPEG-CTT decoder 3 extracts data/time and message occurrence time included in the message management container of each TPEG-CTT message and determines if the following container is a CTT event container based on 'message element' information (i.e. an identifier). If it is determined that the following container is a CTT event container, the TPEG-CTT decoder 3, by extracting each CTT component and the status component included in the CTT component, provides the navigation engine 5 with the information obtained from the container so that the navigation engine 5 can display congestion and travel time information, which will be described below. Providing the navigation engine 5 with the information may include determining, based on identifiers, that the traffic information includes a message management container including status information within various message components within the message management container. The components may each include different status information associated with different links or locations and identifiers associated with the different status information. The containers and components may each include information associated with a generation time, version number, data length, and identifiers of included information.

The TPEG-CTT decoder 3 then obtains information on the link location about which the previously obtained information is created from the following TPEG-CTT location container. The position information may be, for example, coordinates (i.e., latitudes and longitudes) of the start and end positions or a link ID, depending on the type of the TPEG-CTT location container. If the navigation terminal is equipped with the storage structure 4, the navigation engine 5 finds the link location about which the received information is created with reference to information on each link and node stored in the storage structure 4. The navigation engine 5 may convert the coordinates of the link into the link ID or vice versa.

The navigation engine 5 reads a part of the electronic map centered around the position coordinates received from the GPS module 8 from the storage structure 4 and displays the map on the LCD panel 7 via the LCD drive 6. A particular graphic symbol is displayed at the location corresponding to the current position on the LCD panel 7.

Figure 8A:
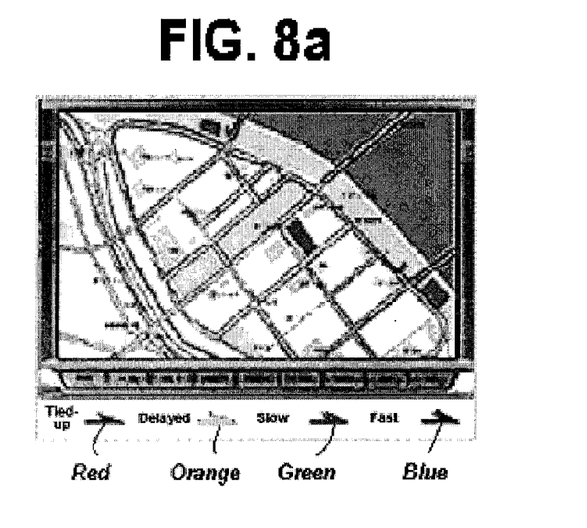
FIGS. 8a and 8b illustrate examples of graphical user interfaces configured to display average speed on a link.
Figure 8B:
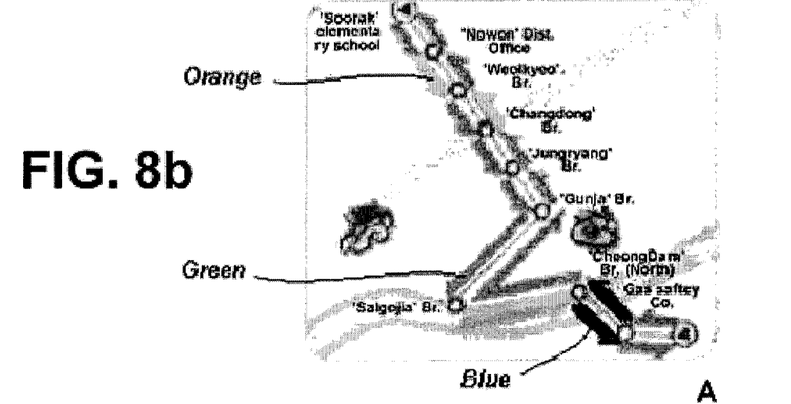
Figure 9A:
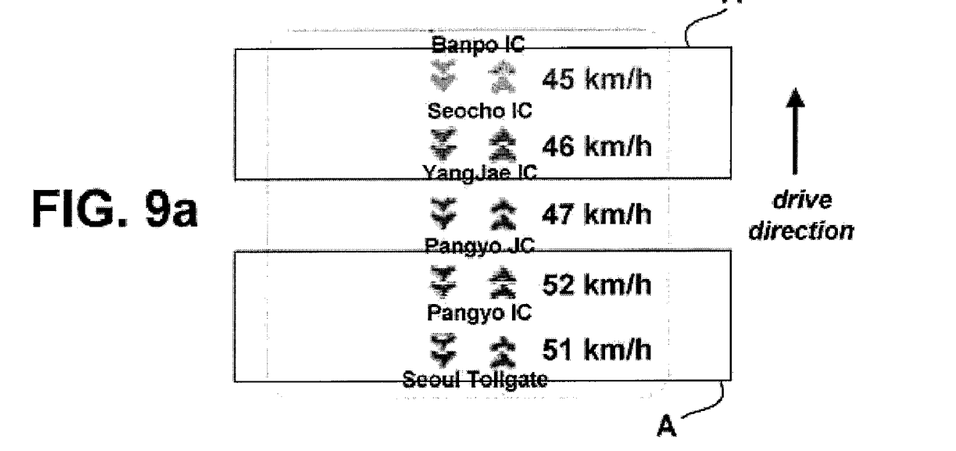
FIG. 9a illustrates an example of a graphical user interface configured to display average speeds on several links with a resolution that is more fine than, e.g., 1.8 km/h.

The navigation engine 5 displays the average speed on a link received from the TPEG-CTT decoder 3 at a location corresponding to the coordinates or link ID delivered via the TPEG-CTT location container following the container delivering the average speed information. As shown in FIG. 8a (map-type display) and 8b (graph-type display), the display method uses different colors according to the average speed on a link. (e.g., red, orange, green, and blue colors indicate average speeds of 0~10 km/h, 10~20 km/h, 20~40 km/h, and over 40 km/h, respectively). If a driver requests the display of the average speeds in the links along a driving route, the navigation engine 5 may show the average speed information corresponding to the links in the front of the current driving route (or the links that belong to a driving route if the route has been predetermined) from among the average speed information received from the TPEG-CTT decoder 3 in the graphic display as shown in FIG. 9a. If a driver requests the display of travel time for the links along a driving route, the navigation engine 5 may show the travel time information corresponding to the links in the front of the current driving route (or the links that belong to a driving route if the route has been predetermined) from among the travel time information of the links received from the TPEG-CTT decoder 3 in the graphic display as shown in FIG. 9b.

FIG. 9a illustrates an example when average speed on a link is delivered with a resolution finer than 1.8 km/h (e.g., the implementations of FIGS. 5a through 5c), the average speed is displayed on the LCD panel 7 by the value included in the corresponding field according to the predetermined resolution (1 km/h in FIG. 5b). Since the resolution is 1 km/h, difference in the average speed between two neighboring links is expressed in 1 km/h resolution (the area marked with 'A') or a multiple of the resolution. If average speed information expressed in another predetermined resolution (0.9 km/h in FIG. 5a or 0.5 km/h and 1 km/h in FIG. 5c) is received, the average speed is obtained by multiplying the received information by the predetermined resolution and difference in the average speed between two neighboring links becomes a multiple of the resolution.

Figure 9B:
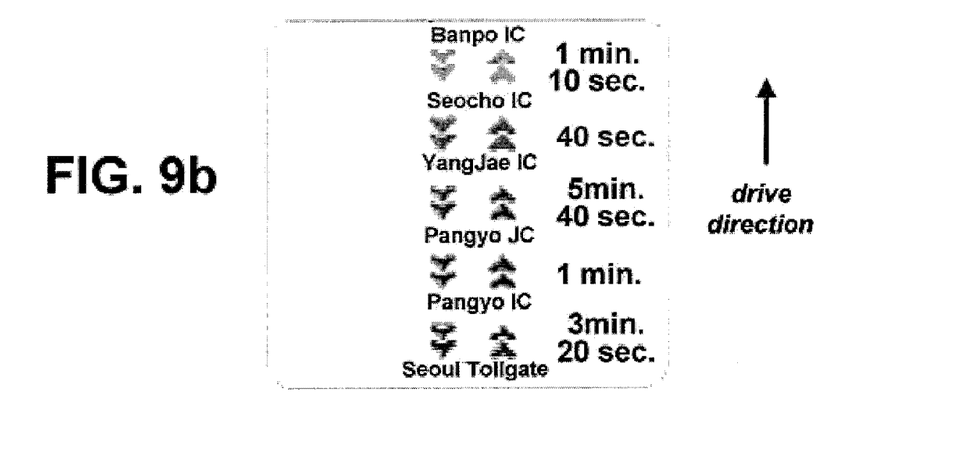
FIG. 9b illustrates an example of a graphical user interface configured to display travel times for links.

FIG. 9b illustrates an example when travel time for a link is provided along with information expressed in units of seconds (e.g., implementations of FIGS. 6a through 6e), the information in units of seconds is also displayed on the LCD panel 7. If time information expressed only in units of seconds is received, the received travel time for the link may be converted to the format of units of minutes: units of seconds when needed.

The average speed or travel time for the link may be displayed on the map such as shown in FIG. 8a along a forward direction or at predetermined links.

In the implementations of FIGS. 5a and 5c, even though the average speed on a link may show a difference below 1 km/h, since the numeric value of the average speed is displayed separately on the screen, a driver, based on the displayed information or on the travel time which is the length of the corresponding link divided by the average speed including the same resolution, may choose a link to drive through.

According to one implementation for a simplified display, according to the user's choice, average speed on a link may be displayed after throwing away the place values below decimal point. Similarly, as to travel time, only the element in minute may be kept and displayed, the element in second being discarded.

Since the travel time for a link within a decoded status component (ID=01) may have information expressed in units of seconds when the TPEG-CTT decoder 3 delivers the travel time to the navigation engine 5, the TPEG-CTT decoder 3 may deliver two-byte information to the navigation engine 5 either by allocating one byte to each of minute and second or by converting the travel time to seconds. (When 16 bit information expressed in units of seconds is received, the information is delivered as received.) Therefore, when the server 100 also provides travel time for a link as the information expressed in units of seconds (e.g., the implementations of FIGS. 6a through 6e), the TPEG-CTT decoder 3 enables the navigation engine 5 to express the travel time for the link down to seconds; when an automated path finding function is provided, the TPEG-CTT decoder 3 enables the navigation engine 5 to find the shortest path by using the travel time for the links including the resolution in second.

If the terminal in FIG. 7 is equipped with a voice output means, the terminal may output received average speed information or travel time for a specified link or links included in a driving route in voice.

The foregoing description has been presented for purposes of illustration. Thus, various implementations with improvements, modifications, substitutions, or additions within the spirit and scope as defined by the following appended claims.

What is claimed is:

1. A device for processing traffic data comprising:
   a receiving unit configured to receive traffic data including a traffic message, the traffic message including:
      a message management container including a generation time of the traffic message, and a version number of the traffic message;
      an event container including a traffic speed component, a travel time information component, a current traffic congestion component, and a predicted traffic congestion component; and
      a location container including a location information for a road,
   wherein the traffic speed component includes speed information, and a first identifier corresponding to the speed information,
   wherein the travel time information component includes travel time information, and a second identifier corresponding to the travel time information,
   wherein the current traffic congestion component includes current congestion information, and a third identifier corresponding to the current congestion information,
   wherein the predicted traffic congestion component includes congestion acceleration tendency information, and
   wherein the traffic message further includes an additional traffic information component, the additional traffic information component including:
      additional traffic information, and
      a language code that identifies the language of the additional traffic information,
   wherein the traffic message further includes a first value for identifying a speed unit for providing the speed information and a second value for identifying a time unit for providing the travel time information, and
   a decoding unit configured to decode received traffic data.

2. The device of claim 1 wherein the speed information in a traffic message consists of 8 bits of the traffic data.

3. The device of claim 1 wherein the speed information indicates a travel speed by representing one of 256 levels of traffic speed.

4. The device of claim 1 wherein a data type of each of the first identifier, the second identifier, and the speed information is <intunti>, and a data type of the travel time information is <intunli>.

5. The device of claim 1, wherein the first value is configured to identify whether the speed unit is m/s (meters per second) or km/h (Kilometers per hour).

6. The device of claim 1, wherein the second value is configured to identify whether the time unit is second or minute.

7. The device of claim 1, wherein the first value is configured to identify whether the speed unit is m/s (meters per second) or km/h (Kilometers per hour), and
   wherein the second value is configured to identify whether the time unit is second or minute.

* * * * *